United States Patent
Leone et al.

(10) Patent No.: US 10,106,146 B2
(45) Date of Patent: Oct. 23, 2018

(54) METHOD AND SYSTEM FOR TORQUE CONTROL

(71) Applicant: Ford Global Technologies, LLC, Dearborn, MI (US)

(72) Inventors: Thomas G. Leone, Ypsilanti, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 322 days.

(21) Appl. No.: 15/196,791

(22) Filed: Jun. 29, 2016

(65) Prior Publication Data

US 2018/0001885 A1   Jan. 4, 2018

(51) Int. Cl.
| | |
|---|---|
| G06G 7/70 | (2006.01) |
| B60W 20/15 | (2016.01) |
| B60K 6/24 | (2007.10) |
| B60W 20/20 | (2016.01) |

(52) U.S. Cl.
CPC .............. B60W 20/15 (2016.01); B60K 6/24 (2013.01); B60W 20/20 (2013.01); B60Y 2200/92 (2013.01); B60Y 2300/192 (2013.01); B60Y 2300/205 (2013.01); B60Y 2300/437 (2013.01); Y10S 903/905 (2013.01)

(58) Field of Classification Search
CPC ......... B60W 20/15; B60W 20/20; B60K 6/24; Y10S 903/905; B60Y 2300/437; B60Y 2300/205; B60Y 2200/92; B60Y 2300/192; F02N 19/004
See application file for complete search history.

(56) References Cited

U.S. PATENT DOCUMENTS

| | | | |
|---|---|---|---|
| 4,572,114 A | 2/1986 | Sickler | |
| 8,095,298 B2 * | 1/2012 | Nakamura | F01L 1/3442 123/179.4 |
| 8,352,153 B2 | 1/2013 | Gibson et al. | |
| 8,412,443 B2 | 4/2013 | Gibson | |
| 8,447,499 B2 | 5/2013 | Gentile et al. | |
| 2006/0168944 A1 * | 8/2006 | Inoue | B60K 6/445 60/284 |
| 2006/0289214 A1 * | 12/2006 | Katsuhiro | F01L 13/08 180/65.225 |
| 2007/0084653 A1 * | 4/2007 | Hughes | B60K 6/48 180/65.31 |
| 2007/0266990 A1 | 11/2007 | Sims | |
| 2013/0179018 A1 * | 7/2013 | Yamamoto | B60W 20/40 701/22 |
| 2014/0096743 A1 | 4/2014 | Meacham | |
| 2015/0134171 A1 * | 5/2015 | Asami | B60W 20/10 701/22 |

* cited by examiner

*Primary Examiner* — Hung Q Nguyen

(74) *Attorney, Agent, or Firm* — David Kelley; McCoy Russell LLP

(57) ABSTRACT

Methods and systems are provided for reducing torque pulsations during hybrid engine shutdown and restarts. A valve actuating mechanism may be actuated to operate an engine with a selected valve lift profile during engine restart and shutdown events that is distinct from the valve lift profile applied during cylinder combustion. The selected valve lift profile reduces cylinder pressure during engine shutdown and restarts.

20 Claims, 5 Drawing Sheets

METHOD AND SYSTEM FOR TORQUE CONTROL

FIELD

The present description relates generally to methods and systems for controlling valve lift profiles to reduce torque pulsations during engine cranking and shutdown.

BACKGROUND/SUMMARY

Vehicles have been developed to perform engine stop at idle conditions when specific conditions are met and then to automatically restart the engine when restart conditions are met (also referred to as start/stop systems). Such idle-stop systems enable fuel savings, reduced exhaust emissions, reduced vehicle noise, and the like. Similarly, hybrid electric vehicle systems operate a vehicle via an engine during selected conditions and via an electric motor during other conditions. The reduction in engine operation time enables significant fuel savings.

However in such vehicle systems, large torque pulsations may be experienced during engine restarts when the engine is being cranked, as well as during engine shutdowns when the engine is spinning to rest. The torque pulsations may be due to compression/expansion work in individual cylinders. In addition, engine cranking requires significant torque and power to overcome the peak pressures, partly because the engine does not have much rotational inertia as compared to higher engine speeds. To reduce the NVH and engine performance issues associated with such torque pulsations, various approaches have been developed to reduce the effective compression ratio of the engine during engine start and shutdown events.

One example approach is shown by Gibson et al. in U.S. Pat. No. 8,352,153. Therein, intake valve closing (IVC) timing is retarded during an engine shutdown and/or during a restart for a cylinder where fueling is resumed during the restart. The resulting delay in the start of compression reduces the maximum cylinder pressure, which reduces the power required to overcome the cylinder pressure and also reduces the associated torque pulsation. Another example is shown by Gibson in U.S. Pat. No. 8,412,443. Therein air charge may be controlled during an engine shutdown via a throttle or alternate charge control device so that it does not exceed a level causing a compression torque that may stop the engine before a restart. In still further examples, such as in hybrid vehicle systems, reserve power may be stored during an engine shutdown to overcome the torque pulsations during the subsequent crank.

However, the inventors herein have recognized potential issues with such systems. As one example, use of reserve power to overcome engine crank torque pulsations reduces the total power available to vehicle wheels. As such, this reduces the maximum vehicle speed and maximum power attainable before the engine must be started. Due to the limited power capability of the electric motor, the engine may be restarted more frequently, such as at lower vehicle speeds and lower driver demands, resulting in a drop in fuel economy. As another example, even with an aircharge level adjusted during the shutdown, there may be noticeable and objectionable NVH due to a driver change-of-mind engine restart. If the engine is kept running to reduce the NVH at a change-of-mind engine restart, the reduced engine shutdown frequency may result in a drop in fuel economy. As yet another example, the starter motors typically used to address torque issues in start-stop systems are bigger, heavier, and costlier, adding to component cost, complexity, and fuel usage.

In one example, the issues described above may be addressed by a method comprising: in response to a hybrid engine shutdown or restart event in a hybrid vehicle, actuating a cam actuator while pulling down or pulling up an engine to operate one or both of an intake valve and an exhaust valve according to an adjusted valve lift profile distinct from an unadjusted valve lift profile used during cylinder combustion, the adjusted valve lift profile enabling a lower cylinder compression pressure than the unadjusted profile; and selecting the adjusted profile based on a state of charge of an energy storage device. The hybrid engine shutdown or restart event in the hybrid vehicle may occur automatically without input from the driver, and without a change in vehicle state or a key state. In this way, unique valve lift profiles may be advantageously used to reduce cylinder pressure and minimize torque pulsations on engine shutdown and restart events.

As one example, during an engine pull-down or pull-up event in a hybrid vehicle system (such as when a hybrid vehicle is in motion and the engine is being shut down or restarted, respectively, while the vehicle continues to be propelled), a selected valve lift profile may be applied for one or more of the intake valve and the exhaust valve. The selected valve lift profile may be distinct from, and applied in addition to or instead of, a default valve lift profile applied during cylinder combustion. The selected valve lift profile may be implemented in each engine cylinder during the engine restart/shutdown event via one or more of cam profile switching mechanisms, electromagnetic valve actuators, electrohydraulic valve actuators, etc. In one example, the selected valve lift profile may be a first profile that delivers an additional exhaust valve event during a compression stroke (in addition to an exhaust stroke exhaust valve event) and an additional intake valve event during an expansion stroke (in addition to an intake stroke intake valve event). In another example, the selected valve lift profile may be a second profile that holds one or more valves in each cylinder open at a constant lift through all strokes of an engine cycle, the constant lift smaller than a peak lift applied during the default valve lift profile. In yet another example, the selected valve lift profile may be a third profile that holds the one or more valves in each cylinder open with a fluctuating lift through all strokes of an engine cycle, the fluctuating lift having a peak in the middle of each stroke, the peak lift being smaller than the peak lift applied during the default valve lift profile. In still a further example, the selected valve lift profile may be a fourth profile with a fluctuating lift that is not reduced at BDC positions. A controller may select between the different profiles during the engine restart/shutdown event based on one or more parameters such as an energy storage device state of charge (of an energy storage device coupled to a motor of the hybrid vehicle system), engine torque actuator constraints (e.g., intake throttle position), piston valve clearance, etc. Further still, distinct profiles may be selected for engine shutdown events relative to engine restart events. For example, when the piston valve clearance is smaller, the fourth valve lift profile may be selected. As another example, when the energy storage device state of charge is lower, one of the other alternate valve lift profiles may be selected.

In an alternate example, the engine system may be operated with only two valve lift profiles including a default valve lift profile applied during regular cylinder combustion plus one alternative profile for engine shutdown and restart events. Herein, the alternative profile to be used may be pre-selected based on actuator design issues and other constraints. The controller would simply choose when to use the default (e.g., normal) valve lift profile and when to use the alternative valve lift profile. In doing so, the control complexity and component requirement of the engine system is reduced.

In this way, cylinder pressure may be reduced during engine cranking and engine shutdown, thereby reducing torque pulsations and associated NVH. Another technical effect of reducing the cylinder pressure during a restart is that the power required to overcome the cylinder pressure is reduced, allowing for a larger portion of a vehicle's reserve power to be applied towards wheel torque. As such, this reduces the frequency of engine pull-up events in a hybrid vehicle. By enabling smoother shutdowns and restarts, NVH associated with a driver change-of-mind restart is reduced, and a hybrid vehicle may be "sailed" (or coasted) with the engine off for longer durations. Consequently, fuel economy is improved. By relying on one or more alternative valve lift profiles to reduce the cylinder pressure during the engine pull-up events, a smoother cranking may be achieved while relying on a smaller, lighter, and more cost-effective starter motor. Overall, the quality and repeatability of engine shutdowns and restarts may be significantly improved, while also improving vehicle fuel efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
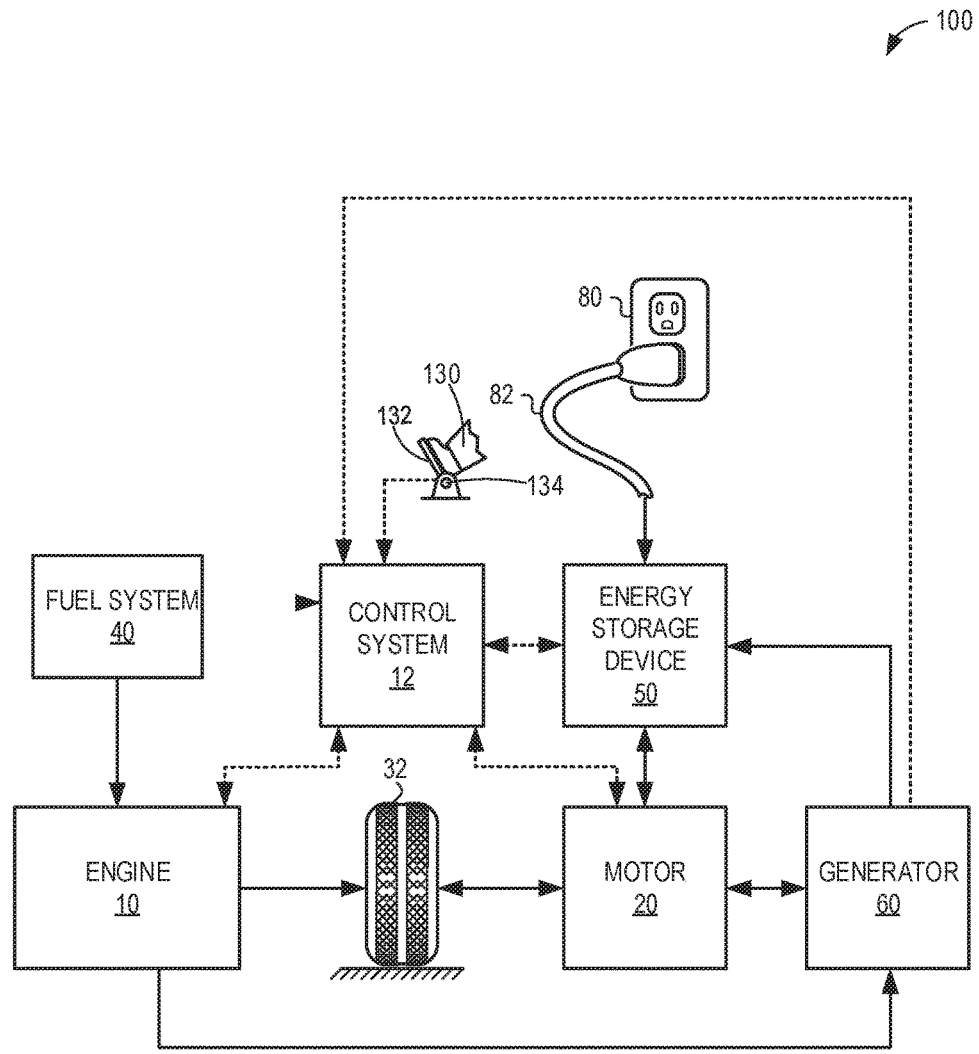
FIG. 1 shows an example embodiment of a hybrid vehicle system.

The following description relates to systems and methods for reducing torque pulsations incurred during engine start and shutdown events in a hybrid vehicle system, such as the vehicle system of FIG. 1. The vehicle system may include an engine configured with variable valve lift actuation, as described with reference to the engine system of FIG. 2. A controller may be configured to perform a control routine, such as the example routine of FIG. 3, to lower the compression pressure of the engine during engine pull-up and pull-down events to reduce associated pumping losses, torque pulsations, and NVH. Example valve lift profiles that may be used by the controller to reduce the cylinder are shown with reference to FIG. 4. An example valve lift adjustment during the course of vehicle operation is shown with reference to FIG. 5. In this way, engine restart and shutdown torque pulsations are reduced.

FIG. 1 illustrates an example vehicle propulsion system 100. Vehicle propulsion system 100 includes a fuel burning engine 10 and a motor 20. As a non-limiting example, engine 10 comprises an internal combustion engine and motor 20 comprises an electric motor. Motor 20 may be configured to utilize or consume a different energy source than engine 10. For example, engine 10 may consume a liquid fuel (e.g., gasoline) to produce an engine output while motor 20 may consume electrical energy to produce a motor output. As such, a vehicle with propulsion system 100 may be referred to as a hybrid electric vehicle (HEV). Specifically, propulsion system 100 is depicted herein as a plug-in hybrid electric vehicle (PHEV).

Vehicle propulsion system 100 may be operated in a variety of different modes depending on vehicle operating conditions. Some of these modes may enable engine 10 to be maintained in an off state (or deactivated state) where combustion of fuel at the engine is discontinued. For example, under select operating conditions, motor 20 may propel the vehicle via drive wheel 32 while engine 10 is deactivated.

During other operating conditions, engine 10 may be deactivated while motor 20 is operated to charge energy storage device 50 via regenerative braking. Therein, motor 20 may receive wheel torque from drive wheel 32 and convert the kinetic energy of the vehicle to electrical energy for storage at energy storage device 50. Thus, motor 20 can provide a generator function in some embodiments. However, in other embodiments, a dedicated energy conversion device, herein generator 60 may instead receive wheel torque from drive wheel 32 and convert the kinetic energy of the vehicle to electrical energy for storage at energy storage device 50. Energy storage device 50 may be, for example, a system battery or set of batteries.

During still other operating conditions, engine 10 may be operated by combusting fuel received from fuel system 40. For example, engine 10 may be operated to propel the vehicle via drive wheel 32 while motor 20 is deactivated. During other operating conditions, both engine 10 and motor 20 may each be operated to propel the vehicle via drive wheel 32. A configuration where both the engine and the motor may selectively propel the vehicle may be referred to as a parallel type vehicle propulsion system. Note that in some embodiments, motor 20 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 20, which may in turn propel the vehicle via drive wheel 32. For example, during select operating conditions, engine 10 may drive generator 60, which may in turn supply electrical energy to one or more of motor 20 or energy storage device 50. As another example, engine 10 may be operated to drive motor 20 which may in turn provide a generator function to convert the engine output to electrical energy, where the electrical energy may be stored at energy storage device 50 for later use by the motor. The vehicle propulsion system may be configured to transition between two or more of the operating modes described above depending on operating conditions.

Fuel system 40 may include one or more fuel storage tanks for storing fuel on-board the vehicle and for providing fuel to engine 10. For example, a fuel tank of fuel system 40 may store one or more liquid fuels, including but not limited to: gasoline, diesel, and alcohol fuels. In some examples, the fuel may be stored on-board the vehicle as a blend of two or more different fuels. Still other suitable fuels or fuel blends may be supplied to engine 10, where they may be combusted at the engine to produce an engine output. The engine output may be utilized to propel the vehicle and/or to recharge energy storage device 50 via motor 20 or generator 60.

Control system 12 may communicate with one or more of engine 10, motor 20, fuel system 40, energy storage device 50, and generator 60. Specifically, control system 12 may receive feedback from one or more of engine 10, motor 20, fuel system 40, energy storage device 50, and generator 60 and send control signals to one or more of them in response. Control system 12 may also receive an indication of an operator requested output of the vehicle propulsion system from a vehicle operator 130. For example, control system 12 may receive feedback from pedal position sensor 134 which communicates with pedal 132. Pedal 132 may refer schematically to an accelerator pedal (as shown) or a brake pedal.

Energy storage device 50 may include one or more batteries and/or capacitors. Energy storage device 50 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

Energy storage device 50 may periodically receive electrical energy from an external power source 80 not residing in the vehicle. As a non-limiting example, vehicle propulsion system 100 may be configured as a plug-in hybrid electric vehicle (HEV), whereby electrical energy may be supplied to energy storage device 50 from power source 80 via an electrical energy transmission cable 82. During a recharging operation of energy storage device 50 from power source 80, electrical transmission cable 82 may electrically couple energy storage device 50 and power source 80. While the vehicle propulsion system is operated to propel the vehicle, electrical transmission cable 82 may be disconnected between power source 80 and energy storage device 50. Control system 12 may estimate and/or control the amount of electrical energy stored at the energy storage device, referred to herein as the state of charge (SOC).

In other embodiments, electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging energy storage device 50 from the external power source 80. In this way, motor 20 may propel the vehicle by utilizing an energy source other than the fuel utilized by engine 10.

Figure 2:
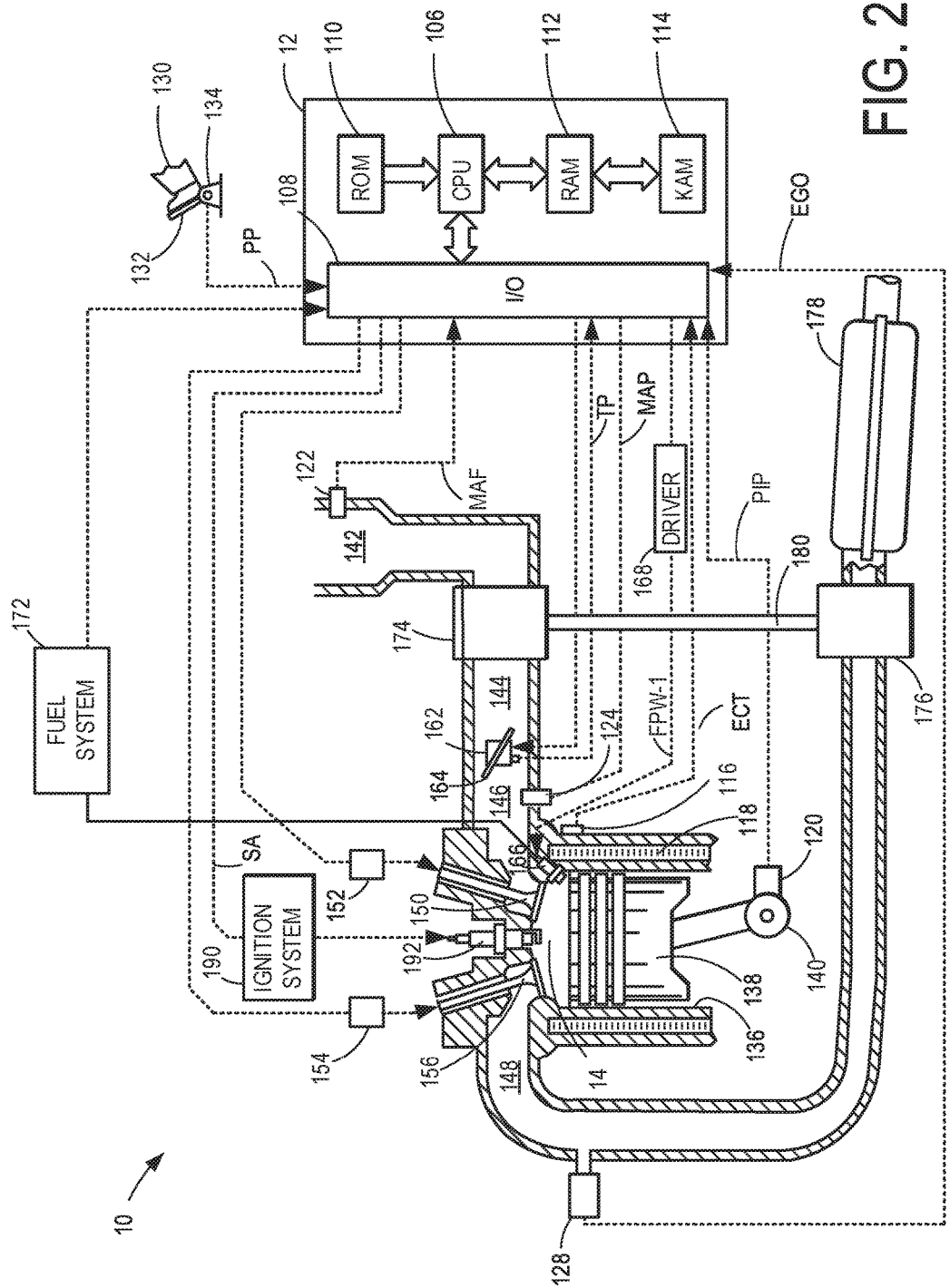
FIG. 2 shows a partial engine view.

FIG. 2 depicts an example embodiment of a combustion chamber or cylinder of internal combustion engine 10. In one example, engine 10 may be coupled in a propulsion system, such as the hybrid vehicle system of FIG. 1. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or may be alternatively provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation, and an exhaust valve controlled via cam actuation including CPS and/or VCT. In other embodiments, the intake and exhaust valves may be controlled by a common valve actuator or actuation system, or a variable valve timing actuator or actuation system. The engine may further include a cam position sensor whose data may be merged with the crankshaft position sensor to determine an engine position and cam timing.

As elaborated herein, one or more of the intake and exhaust valves may be operated with a valve lift profile selected based on operating conditions. For example, a first valve lift profile may be applied during combustion, a second, different valve lift profile may be applied during engine start (while the engine is being cranked), and a third, different profile valve lift profile may be applied during engine shutdown (while the engine is spinning down to rest unfueled). Alternatively, the second valve lift profile may also be applied during engine shutdown. As used herein, the second and third valve lift profiles may include distinct times of opening and closing of an intake and/or exhaust valve, and/or distinct degrees of opening (including a distinct peak lift during the opening of the valve and/or a distinct valve lift profile as a function of crankshaft angle). A controller may select between the valve lift profiles based on a determination that the engine is entering a pull-down (shutdown) or pull-up (restart). The determination may be based on hybrid vehicle operating conditions such as the state of charge of an energy storage device (e.g., battery) coupled to an electric motor of the hybrid vehicle. As another example, the determination may be based on a driver torque demand (or vehicle speed request). The controller may send a signal to a valve actuating mechanism to operate the valves according to the selected valve lift profile. The valve actuating mechanism may include cam profile switching, electromagnetic valve actuators, electrohydraulic valve actuators, and/or a combination thereof.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including fuel injector 166 coupled directly to cylinder 14. Fuel injector 166 may inject fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 2 shows injector 166 as a side injector, it may also be located overhead of the piston, such as near the position of spark plug 192. Alternatively, the injector may be located overhead and near the intake valve. Fuel may be delivered to fuel injector 166 from high pressure fuel system 172 including a fuel tank, fuel pumps, and a fuel rail. Alternatively, fuel may be delivered by a single stage fuel pump at lower pressure. Further, while not shown, the fuel tank may have a pressure transducer providing a signal to controller 12.

It will be appreciated that in an alternate embodiment, injector 166 may be a port injector providing fuel into the intake port upstream of cylinder 14. It will also be appreciated that cylinder 14 may receive fuel from a plurality of injectors, such as a plurality of port injectors, a plurality of direct injectors, or a combination thereof.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type, such as a crankshaft position sensor) coupled to crankshaft 140; throttle position (TP) from a throttle position sensor; and absolute manifold pressure signal (MAP) from sensor 124. Engine speed signal, RPM, may be generated by controller 12 from signal PIP (or the crankshaft position sensor). Manifold pressure signal MAP from a manifold pressure sensor may be used to provide an indication of vacuum, or pressure, in the intake manifold. Storage medium read-only memory 110 can be programmed with computer readable data representing instructions executable by processor 106 for performing the methods described below as well as other variants that are anticipated but not specifically listed.

As described above, FIG. 2 shows only one cylinder of a multi-cylinder engine. As such each cylinder may similarly include its own set of intake/exhaust valves, fuel injector(s), spark plug, etc. The controller 12 receives signals from the various sensors of FIGS. 1 and 2 and employs the various actuators of FIGS. 1 and 2 to adjust vehicle operation based on the received signals and instructions stored on a memory of the controller. For example, in response to an operator request for an engine shutdown, the controller may send a signal to shut-off fuel and spark to the engine cylinders, while actuating a valve lift actuator to operate engine valves in accordance with a valve lift profile selected for the engine shutdown.

In this way, the system of FIGS. 1-2 enables a hybrid vehicle system comprising: an engine; a motor coupled to an energy storage device; a cam profile switching mechanism for switching between a plurality of cam profiles, each of the plurality of cam profiles associated with an alternate valve lift profile; and a controller. The controller may be configured with computer readable instructions stored on non-transitory memory for: in response to a hybrid engine restart (wherein the engine is started without input from the driver and without a change in vehicle state or ignition key state), cranking the engine with a first of the plurality of cam profiles selected to operate all intake valves and exhaust valves of all engine cylinders with at least a minimum valve lift through all strokes of a cylinder cycle; after engine speed is higher than a threshold speed, transitioning to a default valve lift profile to operate all intake valves of all engine cylinders with a fluctuating lift through only an intake stroke of the cylinder cycle, and operate all exhaust valves of all engine cylinders with a fluctuating lift through only an exhaust stroke of the cylinder cycle. Additionally or optionally, the controller may include further instructions for: in response to a hybrid engine stop or shutdown (wherein the engine is stopped or shutdown without input from the driver and without a change in vehicle state or ignition key state), spinning down the engine unfueled, and when the engine speed is lower than the threshold, spinning the engine to rest with a second of the plurality of cam profiles selected to operate all intake valves and exhaust valves of all engine cylinders with at least the minimum valve lift through all strokes of a cylinder cycle. Additionally or optionally, the minimum valve lift when operating with the first or second cam profile may be larger than the minimum valve lift when operating with default valve lift profile.

Figure 3:
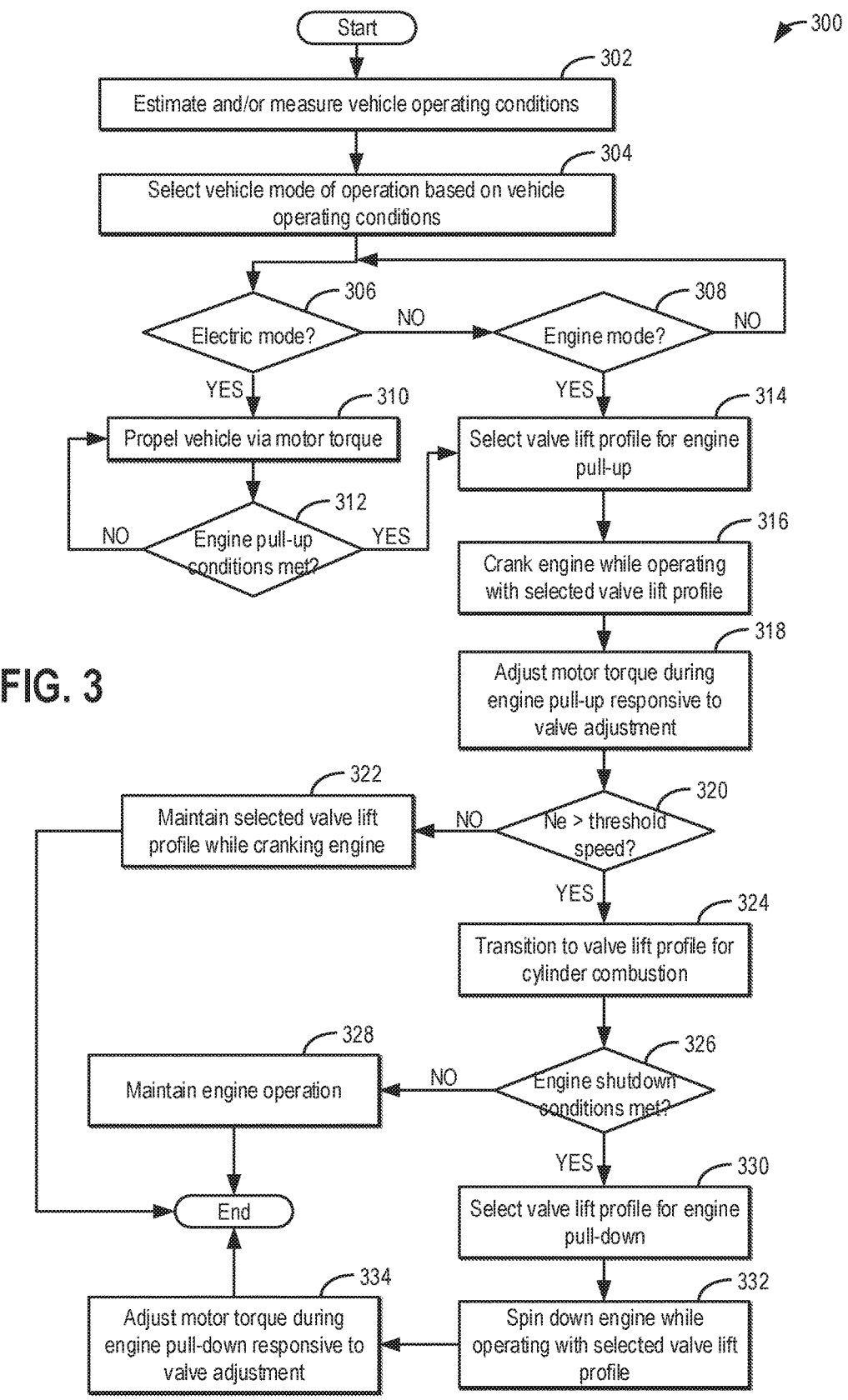
FIG. 3 shows a high level flowchart of an example method for adjusting a valve lift profile during engine pull-down and engine pull-up events to reduce torque pulsations.

Turning now to FIG. 3, an example routine 300 is described for adjusting a valve lift profile for one or more valves of an engine during engine pull-up or pull-down event. The method enables reduction in NVH and pumping losses during hybrid engine pull-up and pull-down events in the hybrid vehicle, while also reducing associated torque pulsations and the power required for engine pull-up. Instructions for carrying out method 300 as well the other methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the routine includes estimating and/or measuring vehicle operating conditions. These may include, for example, driver torque demand (such as based on output of a pedal position sensor coupled to an operator pedal), vehicle speed, engine speed, ambient temperature, pressure and humidity, engine temperature, state of charge of an energy storage device (such as a battery), fuel level in a fuel tank, fuel octane of available fuel(s), etc. In addition, engine operating conditions such as manifold pressure (MAP), manifold air flow (MAF), engine temperature, catalyst temperature, intake temperature, knock limits, etc., may be estimated.

At 304, the method includes determining a vehicle mode of operation based on the estimated vehicle operating conditions. This includes shifting between propelling the vehicle with motor torque and engine torque responsive to the engine operating conditions, including the driver demand. For example, an electric mode of operation may be selected when the torque demand is lower, when the fuel level in the fuel tank is lower, and/or when the battery state of charge is higher. In the electric mode, the vehicle wheels may be propelled only via motor torque from a motor, such as an electric motor, that is powered by a system energy storage device, such as a system battery. As another example, an engine mode of operation may be selected when the torqe demand is higher, when the fuel level in the fuel tank is higher, and/or when the battery state of charge is lower. In the engine mode, the vehicle wheels may be propelled only via engine torque from an engine. Further still, an assist mode may be selected if the torque is higher than a level that can be provided via only engine torque. Therein, the vehicle wheels may be propelled via a combination of motor torque and engine torque.

At 306, it may be confirmed if the electric mode was selected. Herein the electric mode may be a pure electric mode wherein a vehicle is propelled only using motor torque. If yes, then at 310, the method includes propelling the vehicle via only motor torque. At 312, while operating in the electric mode, it may be determined if hybrid engine restart (herein also referred to as engine pull-up) conditions are met. A hybrid engine restart includes a restart where the engine in a hybrid vehicle is started without input from the driver and without a change in vehicle state or ignition key state.

For example, it may be determined if there is a change in operating conditions that warrants a transition to the engine mode (that is, a pure engine mode wherein the vehicle is propelled via only engine torque), or an assist mode (wherein the vehicle is propelled primarily via engine torque, and with the motor torque supplementing the engine torque). As one example, a transition to engine mode may be required if the battery state of charge drops below a threshold and the battery has to be recharged. As another example, a transition to the engine mode or the assist mode may be required if the driver torque demand rises above a threshold demand which cannot be met by the motor alone. If a transition to the engine mode or the assist mode is not required, the vehicle may continue to be propelled via only motor torque. Else, the routine may move to 314, to restart the engine, as described below. If an electric mode is not confirmed, at 308, it may be confirmed if the engine mode was selected. Alternatively, it may be determined if the assist mode was selected. If yes, then at 314, the method includes selecting an alternate valve lift profile for the upcoming engine restart/pull-up event. The alternate valve profile has a valve lift that distinct from the valve lift of the unadjusted or default valve profile. The controller may select an alternate valve lift profile from a plurality of alternate valve lift profiles, each of which reduces the cylinder pressure during the compression/expansion stroke while an engine is being cranked. By reducing the cylinder pressure, the engine work required to overcome the cylinder pressure is reduced, improving vehicle powertrain output. In addition, torque pulsations and NVH associated with the engine spin-up are reduced. As such, the plurality of alternate valve lift profiles may be different from a default valve lift profile applied during cylinder combustion that includes an intake valve event during the intake stroke of a cylinder's cycle, and an exhaust valve event during the exhaust stroke of the cylinder's cycle.

The plurality of alternate valve lift profiles may include, for example, a first alternate valve lift profile that includes an intake valve event during each of an intake stroke and a power stroke of the cycle and an exhaust valve event during each of an exhaust stroke and a compression stroke of the cycle. That is, the first alternate valve lift profile includes an additional intake valve event and an additional exhaust valve event as compared to the default valve lift profile. The duplicated intake valve event and exhaust valve event added to the compression and expansion stroke may have substantially the same degree of valve opening as their counterparts in the intake and exhaust strokes, including the same peak degree of valve opening in the middle of the piston stroke.

The plurality of alternate valve lift profiles may further include a second alternate valve lift profile that includes a fixed lift for one or more of the intake and exhaust valve events, the fixed lift maintained through all strokes of the cylinder cycle. A degree of valve opening in the fixed lift profile may be smaller than a peak degree of valve opening of the default valve lift profile. The fixed lift amount may be low enough to avoid piston-to-valve interference at TDC, for example a lift of approximately 3 millimeters. By holding the one or more valves of each cylinder open with the fixed low lift, compression pulses at low RPM commonly incurred during cranking can be reduced.

The plurality of alternate valve lift profiles may further include a valve lift profile having a fluctuating low lift for one or more of the intake and exhaust valve events. The fluctuating lift profile may include a peak lift (or maximum degree of opening) in the middle of each piston stroke of the cylinder cycle, the lift dropping (to a minimum degree of opening) when the piston reaches TDC or BDC at each end of a piston stroke of the cylinder cycle. A peak degree of valve opening in the fluctuating lift profile may be smaller than a peak degree of valve opening of the default valve lift profile. Herein, pumping losses and pressure fluctuations are reduced by providing more valve lift in the middle of each piston stroke when the piston velocity is high. The fluctuating low lift profile may be used on engines with low piston-to-valve clearance, where the previous example of fixed valve lift is not feasible.

The plurality of alternate valve lift profiles may further include a fourth alternate valve lift profile having a fluctuating lift for one or all the intake and valve events. The fourth fluctuating alternate lift profile may include a peak lift (or maximum degree of opening) in the middle of each piston stroke of the cylinder cycle, the lift dropping (to a minimum degree of opening) when the piston reaches TDC of a piston stroke of the cylinder cycle. In addition, the fourth alternate valve lift profile may include the lift not reducing to the minimum degree of opening when the piston reaches BDC of a piston stroke of the cylinder cycle. A peak degree of valve opening in the fourth fluctuating lift profile may be the same as that for the third fluctuating lift profile (that is, smaller than a peak degree of valve opening of the default valve lift profile, smaller than or equal to the peak degree of valve opening of the first valve lift profile, and larger than or equal to the peak degree of valve opening of the second (fixed lift) valve lift profile). Herein, pumping losses and pressure fluctuations are reduced by holding more valve lift in the middle of each piston stroke when the piston velocity is high. The fluctuating low lift profile may be used on engines with low piston-to-valve clearance, where the previous example of fixed valve lift is not feasible.

The controller may select one of the plurality of cylinder pressure reducing alternate valve lift profiles based on a state of charge of the energy storage device as well as based on engine actuator constraints. The selecting may be further based on a piston-to-valve clearance. Further still, the selecting may be based on a desired engine starting position at a time of the restart. The engine start position includes the position of a piston in a cylinder selected for a first combustion event during the restart. As one example, a valve lift profile may be selected that enables a cylinder with a piston at the desired start position to be the cylinder that receives fuel first during the engine restart event. As non-limiting examples, the selecting a valve lift profile may be be based on a battery state of charge at the time of the hybrid engine pull-up, the piston-to-valve clearance at the time of the hybrid engine pull-up, etc. As further elaborated herein, distinct alternate valve lift profiles may be selected during an engine restart event as compared to an engine shutdown event.

Selecting the valve lift profile may further include selecting a number and identity of one or both of an intake valve and an exhaust valve. In particular, the controller may determine whether to apply the alternate valve lift profile for one or more intake valves, one or more exhaust valves, or all valves of all cylinders. In one example, during a first condition, the selected valve lift profile may be applied to only the intake valve of all cylinders. In another example, during a first condition, the selected valve lift profile may be applied to only the exhaust valve of all cylinders. In yet another example, during a third condition, the selected valve lift profile may be applied to all valves of all cylinders.

In an alternate example, the engine system may be operated with only two valve lift profiles including a default valve lift profile applied during regular cylinder combustion plus one alternative profile for engine restart events. Herein, the alternative profile to be used may be pre-selected (from the first to fourth alternate valve lift profiles listed above) based on actuator design issues and other constraints. The controller may select when to use the default (e.g., normal) valve lift profile and when to use the alternative valve lift profile. In doing so, the control complexity and component requirement of the engine system is reduced.

At 316, the method includes pulling up or restarting the engine while operating with the selected alternate valve lift profile. During the hybrid engine pull-up, delivery and combustion of fuel in the engine cylinders is initiated so as to spin the engine up from rest. Pulling up the engine includes cranking the engine by initiating fuel delivery to engine cylinders and initiating fuel combustion in all engine cylinders while operating the intake and exhaust valves of each cylinder according to the selected alternate valve lift profile so as to reduce the compression pressure experienced at least during the compression and expansion strokes of the cylinder. For example, the engine may be pulled-up with all valves of all cylinders operating with higher than threshold lift for all strokes of all combustion events until a target engine speed is reached. As such, pulling up the engine with the alternate valve lift profile reduces the torque pulsations and NVH issues otherwise associated with an engine pull-up.

It will be appreciated that during the engine pull-up event, the hybrid vehicle may continue to be propelled, such as using motor torque. In particular, at 318, while pulling up the engine, a motor torque output by the vehicle motor may be adjusted to compensate for any deficit in torque demand resulting from the usage of the alternate valve lift profile. For example, a positive motor torque may be output to enable the vehicle to continue to be propelled according to the driver demand as the engine is pulled-up. In this way, errors induced by the valve adjustment may be compensated for. As such, during the hybrid engine restart, the engine is restarted and sound up fueled from a state of rest (zero speed) without receiving input from the vehicle operator and without a change in the vehicle state or the state of an ignition key.

At 320, it may be determined if the engine speed (Ne) is higher than a threshold speed. For example, it may be determined if the engine speed is above a non-zero threshold speed, such as at or above an idle speed, indicating cranking is completed. For example, the threshold speed may be in the 600-1000 rpm range or in the high idle speed range. If the threshold speed is not reached, the alternate valve lift profile is maintained until the threshold speed is crossed at 322. The alternate lift profile lowers the negative IMEP in the compression-expansion loop, reducing torque pulsations that would have otherwise been experienced due to the compression-expansion cycles of the cylinder as the engine passed through the range of speeds in the cranking region. In addition, the engine may be restarted with lower friction, fewer heat transfer losses, and lower pumping losses. Furthermore, the lower cylinder pressure decreases piston ring friction and piston side loads.

If the engine speed is at or above the threshold speed, at 324, the method includes transitioning the engine to a valve lift profile for combustion. The valve lift for combustion may be a default valve lift profile. The default valve lift profile may include an intake valve event during the intake stroke of a cylinder's cycle, and an exhaust valve event during the exhaust stroke of the cylinder's cycle. Further, in the default valve lift profile, the valve lift may peak in the middle of a stroke and drop at each end of a stroke where the piston is at TDC or BDC. In this way, during the engine pull-up event, the engine is operated with the adjusted valve lift profile until an engine speed is above the threshold speed and then transitioned to the unadjusted/default valve lift profile.

Optionally, while transitioning from the alternate valve lift profile to the default valve lift profile, torque transients may be smoothed using motor torque. In this way, battery power can used to smooth out torque transients by filling in torque holes that are caused by changing the valve lift profile. This leads to additional fuel economy improvements by reducing the need for spark retard which would otherwise have been required to smooth the torque transients.

At 326, it may be determined if engine shutdown conditions are met. For example, it may be determined if there is a change in operating conditions requiring a transition to the electric mode wherein the vehicle is propelled with motor torque. In one example, engine shutdown conditions may be met if the driver torque demand is below a threshold and/or if the battery state of charge is sufficiently high to support the electric mode of operation. If engine shutdown conditions are not met, then at 328, the method includes maintaining engine operation with the default valve lift profile.

If engine shutdown conditions are met, then at 330, the method includes selecting an alternate valve lift profile for the upcoming engine pull-down event. The controller may select an alternate valve lift profile from the plurality of alternate valve lift profiles, such as those discussed earlier, each of which reduces the cylinder pressure during the compression/expansion stroke while an engine is being spun to rest. By reducing the cylinder pressure, the engine work required to overcome the cylinder pressure is reduced, improving vehicle powertrain output. In addition, torque pulsations and NVH associated with the engine spin-down are reduced. As such, the plurality of alternate valve lift profiles may be different from the default valve lift profile applied during cylinder combustion.

For example, during an engine shutdown, the controller may select the first alternate valve lift profile that includes an intake valve event during each of an intake stroke and a power stroke of the cycle and an exhaust valve event during each of an exhaust stroke and a comrpession stroke of the cycle. Alternatively, the controller may select the second alternate valve lift profile that includes a fixed lift for one or all the valve events, the fixed lift maintained through all strokes of the cylinder cycle. Further still, the controller may select the third alternate valve lift profile having a fluctuating low lift. The fluctuating low lift profile may be applied when piston-to-valve clearance is lower during the engine shutdown, the clearance limiting the valve lift to a lower than threshold value. Further still, the controller may select the fourth alternate valve lift profile having a fluctuating lift for one or all the valve events with the valve lift not dropping when the piston reaches BDC of a piston stroke of the cylinder cycle. The fluctuating low lift profile with no dropping of valve lift at BDC may be applied when piston-to-valve clearance is lower, the clearance limiting the valve lift to a lower than threshold value. In one example, the piston-to-valve clearance is based on each of crank angle, degree of valve lift, and piston position.

The controller may select one of the plurality of cylinder pressure reducing alternate valve lift profiles based on a state of charge of the energy storage device as well as based on engine actuator constraints, such as a piston-to-valve clearance. Further still, the selecting may be based on a desired engine start position at a time of a subsequent restart or a desired engine stopping position at a time of the engine pull-down. The desired engine start position may include a desired position of a piston in a cylinder selected for a first combustion event during the subsequent engine restart. The desired engine stopping position may include a desired position of a piston in a cylinder selected for a first combustion event during the subsequent engine restart. In one example, a valve lift profile may be selected so that at the end of the engine shutdown, the engine comes to rest with the piston of the cylinder scheduled to receive fuel first during the subsequent restart at the desired position. As non-limiting examples, the valve lift profile selection may be based on a battery state of charge at the time of the engine pull-down, the piston-to-valve clearance at the time of the engine pull-down, etc.

In an alternate example, the engine system may be operated with only two valve lift profiles including a default valve lift profile applied during regular cylinder combustion plus one alternative profile for engine shutdown events. Herein, the alternative profile to be used may be pre-selected (from the first to fourth alternate valve lift profiles listed above) based on actuator design issues and other constraints. The controller may select when to use the default (e.g., normal) valve lift profile and when to use the alternative valve lift profile. In doing so, the control complexity and component requirement of the engine system is reduced.

In one example, the routine adjusts which cam is selected and/or a cam timing based on a signal indicative of which valve lift profile is to be applied. For example, the controller may determine a control signal to send to an actuator coupled to the cam profile switching device, such as a desired cam profile to operate the cam associated with (one of) the alternate valve lift profile(s) based on a determination that a hybrid engine restart condition or a hybrid engine shutdown condition has been met. As another example, the controller may determine a control signal to send to the actuator coupled to the cam profile switching device, such as a desired cam profile to operate the cam associated with the default valve lift profile(s) based on a determination that a threshold speed has been exceeded after the hybrid engine restart or the engine has not been spun down to the threshold speed on the hybrid engine shutdown.

Selecting the valve lift profile may further include selecting whether to apply the alternate valve lift profile for one or more intake valves, one or more exhaust valves, or all valves of all cylinders. In one example, during first condition, the selected valve lift profile may be applied to only the intake valve of all cylinders. In another example, during a second condition, the selected valve lift profile may be applied to only the exhaust valve of all cylinders. In yet another example, during a third condition, the selected valve lift profile may be applied to all valves of all cylinders. In one example, the number and identity of intake valves and exhaust valves selected during the engine spin-down may be different from the number and identity of intake valves and exhaust valves selected during the engine restart.

At 332, after selecting an alternate valve lift profile for engine shutdown, the method includes pulling down the engine while operating with the selected alternate valve lift profile. In particular, during the engine pull-down event, the engine is operated with the unadjusted valve lift profile until the engine speed is at or below the threshold speed, and then transitioned to the adjusted valve lift profile. Thus the engine is spun, unfueled, to rest with one or more valves actuated according to the selected alternate valve lift profile. During the engine pull-down, fuel delivery to the engine is discontinued. In addition, cylinder combustion is discontinued. As such, prior to the pull-down, the engine may be combusting fuel and spinning at an engine speed, and then during the pull down, combustion of fuel in the engine is discontinued and the engine is spun down to rest. The engine pull-down may include discontinuing fuel delivery to engine cylinders while propelling the vehicle using motor torque drawn from the electric motor, which is driven using power from the system battery. As such, during the hybrid engine shutdown, the engine is shutdown and spun down to rest (zero speed) unfueled without receiving input from the vehicle operator and without a change in the vehicle state or the state of an ignition key.

It will be appreciated that during the engine pull-down event, the hybrid vehicle may continue to be propelled, such as using motor torque. In particular, at 334, as at 318, while pulling down the engine, any deficit in driver torque demand resulting from the usage of the alternate valve lift profile may be compensated for via adjustments to a motor torque from a motor coupled to an anergu storage device in the hybrid vehicle. For example, a positive motor torque may be output to enable the vehicle to continue to be propelled according to the driver demand as the engine is pulled-down. In this way, errors induced by the valve adjustment may be compensated for.

In this way, during a change from electric mode to engine mode of vehicle operation, a vehicle controller may propel the vehicle while operating all valves of each engine cylinder according to a first adjusted valve lift profile before transitioning to a default valve lift profile. In comparison, during a change from engine mode to electric mode of vehicle operation, the vehicle controller may propel the vehicle while transitioning from a default valve lift profile to operating all valves of each engine cylinder according to a second, different adjusted valve lift profile, wherein a cylinder compression pressure is lower in each of the first and second adjusted profiles relative to the default valve lift profile. Further, during both the change from electric mode to engine mode and the change from engine mode to electric mode, the controller may compensate for a deficit in driver demand via motor torque from a motor coupled to an energy storage device. Operating all valves according to the first adjusted valve lift profile includes actuating a cam actuator to select a first cam profile, operating all valves according to the second adjusted valve lift profile includes actuating the cam actuator to select a second, different cam profile, and operating all valves according to the default valve lift profile includes actuating the cam actuator to select a default cam profile. Herein, the first adjusted valve lift profile is applied until engine speed is higher than a threshold during the change from electric mode to engine mode, while the second adjusted valve lift profile is applied when the engine speed is lower than the threshold during the change from engine mode to electric mode.

In one example, the first and second adjusted valve lift profiles applied during the change from electric mode to engine mode and engine mode to electric mode, respectively, may be selected from a plurality of adjusted valve lift profiles that include a first profile having an exhaust valve event in each of an exhaust stroke and a compression stroke of a cylinder cycle and an intake valve event in each of an intake stroke and an expansion stroke of the cylinder cycle, a peak valve lift of the first profile equal to a peak valve lift of the default, unadjusted valve lift profile. The plurality of adjusted valve lift profiles may further include a second profile wherein the one or both of an intake valve and an exhaust valve of each cylinder are maintained open with a fixed lift during each of stroke of the cylinder cycle, the fixed lift smaller than the peak valve lift of the first profile. The plurality of adjusted valve lift profiles may further include a third profile wherein the one or both of an intake valve and an exhaust valve of each cylinder are maintained open with a fluctuating lift during each of stroke of the cylinder cycle, the fluctuating lift including an initial lift at a beginning and an end of each stroke of the cylinder cycle and a peak valve lift at a middle of each stroke of the cylinder cycle, the peak valve lift of the third profile equal to or smaller than the peak valve lift of the first profile, the initial lift of the third profile equal to or smaller than the fixed lift of the second profile. The plurality of adjusted valve lift profiles may also further include a fourth profile wherein the one or both of an intake valve and an exhaust valve of each cylinder are maintained open with a fluctuating lift during each of stroke of the cylinder cycle, the fluctuating lift including an initial lift when a piston is at TDC in each stroke of the cylinder cycle and a peak valve lift at a middle of each stroke of the cylinder cycle and when the piston is at BDC in each stroke of the cylinder cycle, the peak valve lift of the fourth profile equal to or smaller than the peak valve lift of the first profile, the initial lift of the fourth profile equal to or smaller than the fixed lift of the second profile.

In this way, torque pulsations and NVH associated with an engine pull-down and an engine pull-up are reduced.

Figure 4:
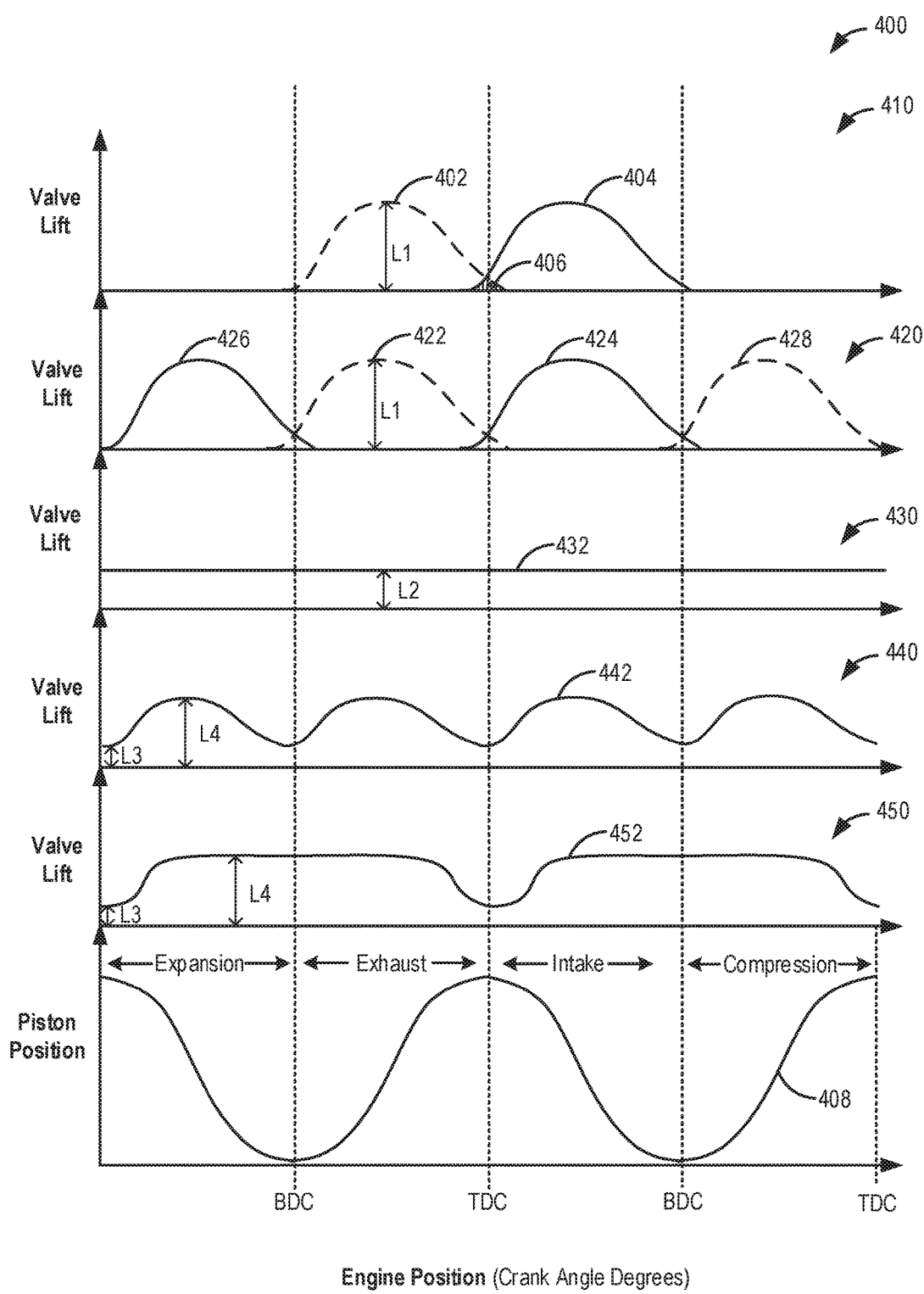
FIG. 4 shows example valve lift profiles that may be used during engine pull-down and engine pull-up events, as compared to those used during cylinder combustion.

FIG. 4 shows a map 400 of example valve lift profiles. Each valve lift profile 410-450 displays valve timing and lift, with respect to a piston position in an engine cycle, for a given engine cylinder. During an engine start, while the engine is being cranked, an engine controller may be configured to select one of the valve lift profiles so as to reduce cylinder torque pulsations. In addition, during an engine shutdown, while the engine is being spun to rest, the engine controller may be configured to select another of the valve lift profiles so as to reduce cylinder torque pulsations. Engine position is depicted along the x-axis in crank angle degrees (CAD).

Curve 408 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 408, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

A first valve lift profile is shown at 410. The first valve lift profile may be a default valve lift profile used during cylinder combustion. Curves 402 and 404 depict valve timings for an exhaust valve (dashed curve 402) and an intake valve (solid curve 404) during a normal engine operation. As illustrated, an exhaust valve may be opened just as the piston bottoms out at the end of the expansion stroke. The exhaust valve may then close as the piston completes the exhaust stroke, remaining open at least until a subsequent intake stroke has commenced. A peak lift of the valve (representative of a highest degree of opening or lift of the exhaust valve) occurs in the middle of the exhaust stroke when the piston is about half way between TDC and BDC. In the same way, an intake valve may be opened at or before the start of an intake stroke, and may remain open at least until a subsequent compression stroke has commenced. A peak lift of the valve (representative of a highest degree of opening or lift of the intake valve) occurs in the middle of the intake stroke when the piston is about half way between TDC and BDC. In the depicted example, both valves have a peak valve lift L1.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 406 (or simply, positive valve overlap), represented by a hatched region at the intersection of curves 402 and 404. In one example, the positive intake to exhaust valve overlap 406 may be a default cam position of the engine present during an engine cold start.

A second valve lift profile is shown at 420. The second valve lift profile may be one of a plurality of alternate valve lift profiles used during an engine pull-down or an engine pull-up event. Curves 422 and 428 (dashed curves) depict valve timings for an exhaust valve while curves 424 and 426 depict valve timings for an intake valve (solid curves) during engine cranking and also during engine spin-down to rest. As illustrated, an exhaust valve may be opened just as the piston bottoms out at the end of the expansion stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced. An additional set of intake and exhaust valve events are duplicated in the compression and expansion strokes of the cycle. In particular, the exhaust valve may also be opened just as the piston bottoms out at the end of the intake stroke. The exhaust valve may then close as the piston completes the compression stroke, remaining open at least until a subsequent expansion stroke has commenced. In the same way, the intake valve may also be opened at or before the start of an expansion stroke stroke, and may remain open at least until a subsequent exhaust stroke has commenced. That is, alternate valve lift profile 420 includes an additional intake valve event and exhaust valve event relative to the default valve lift profile. A peak lift of the exhaust valve occurs in the middle of the exhaust stroke and the compression stroke when the piston is about half way between TDC and BDC. A peak lift of the intake valve occurs in the middle of the intake stroke and the expansion stroke when the piston is about half way between TDC and BDC. The duplicated intake valve event and exhaust valve event added to the expansion and compression stroke, respectively, have the same degree of valve opening as their counterparts in the intake and exhaust strokes, including the same peak lift L1 in the middle of the corresponding piston stroke.

A third valve lift profile is shown at 430. The third valve lift profile may also be one of a plurality of alternate valve lift profiles used during an engine pull-down or an engine pull-up event. Line 432 depicts valve timings for one or more of the intake valve and the exhaust valve during engine cranking and also during engine spin-down to rest. As illustrated, the intake and exhaust valves are operated with a fixed lift for all the valve events, the fixed lift maintained through all strokes of the cylinder cycle. In other words, the intake valve and exhaust valve remain open with valve lift L2 through all strokes of the cylinder. Valve lift L2 is smaller than peak lift L2 applied in each of the valve lift profiles 410 and 420. Valve lift L2 is designed to be low enough to avoid piston-to-valve interference at TDC. By holding the valves of each cylinder open with the fixed low lift, compression pulses at low RPM commonly incurred during cranking and engine spin-down are reduced.

A fourth valve lift profile is shown at 440. The fourth valve lift profile may also be one of a plurality of alternate valve lift profiles used during an engine pull-down or an engine pull-up event. Fourth valve lift profile 440 has a fluctuating low lift for all the valve events depicted at curve 442. In the fourth valve lift profile, the intake and exhaust valves are operated with at least a minimum lift L3 for all the valve events through all strokes of the cylinder cycle, the minimum lift rising to a peak lift L4 in the middle of each piston stroke. Herein, each valve may be held open with the minimum lift when the piston bottoms out at the end of each stroke, the valve lift increasing through the middle of each piston stroke and then returning to the minimum lift as the piston completes the stroke. Minimum lift L3 may be equal to or smaller than valve lift L2 of the fixed lift profile shown at 430. Peak lift L4 may be equal to or smaller than valve lift L1 of the second lift profile shown at 420.

A fifth valve lift profile is shown at 450. The fifth valve lift profile may also be one of a plurality of alternate valve lift profiles used during an engine pull-down or an engine pull-up event. Fifth valve lift profile 450 also has a fluctuating low lift for all the valve events, as depicted at curve 452. In the fifth valve lift profile, the intake and exhaust valves are operated with at least a minimum lift L3 for all the valve events through all strokes of the cylinder cycle, the minimum lift rising to a peak lift L4 in the middle of each piston stroke. However, the valve lift is maintained at the peak lift when the piston reaches BDC at the end of expansion and intake strokes, and selectively reduced to the minimum lift when the piston reaches TDC at the end of exhaust and compression strokes. That is, the valve lift is not reduced when the piston reaches BDC. Minimum lift L3 may be equal to or smaller than valve lift L2 of the fixed lift profile shown at 430. Peak lift L4 may be equal to or smaller than valve lift L1 of the second lift profile shown at 420.

It will be appreciated that for each alternate valve lift profile, the profile may be the same (or as indicated) for all four cylinder strokes (intake, compression, expansion, exhaust) during a cylinder event. The alternate valve lift profile could be applied to all intake and exhaust valves, or only to the two intake valves, or only to the two exhaust valves, or to only one valve (either intake or exhaust). In one example, this decision may be made during the engine design stage, such that the determined profile is then applied to those valve(s) for every engine restart/pull-up and every engine shutdown/pull-down event. Alternatively, the controller may select which valves to apply the selected profile to during the engine restart or shutdown event based on engine and vehicle conditions at that time.

Figure 5:
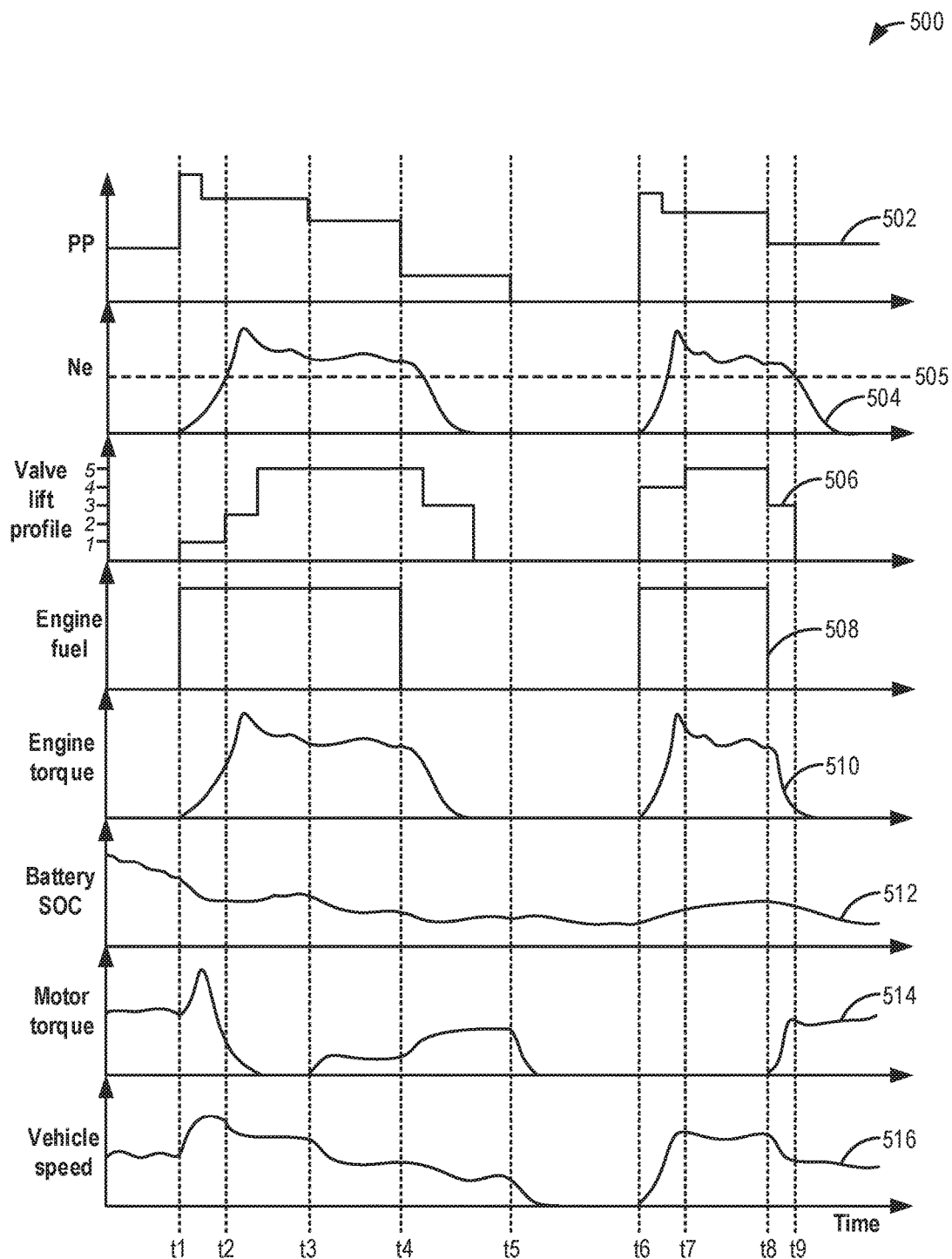
FIG. 5 shows an example valve lift adjustment during hybrid vehicle operation.

Turning now to FIG. 5, example valve lift profile adjustments during operation of a hybrid electric vehicle are shown at map 500. Map 500 depicts changes to an operator pedal position (PP) at plot 502, engine speed at plot 504, engine fueling (on or off) at plot 508, engine torque output at plot 510, a battery state of charge (SOC) at plot 512, motor torque output at plot 514, and vehicle speed at plot 516. A valve lift profile selection is depicted at plot 506, wherein a valve lift profile is selected from profile_1 through profile_5. Herein, profile_5 may be default profile selected during cylinder combustion while profiles_1-4 are alternate valve lift profiles selected from during engine pull-up and pull-down events. For example profiles_1-4 may include any of profiles 420-450 of FIG. 4. All plots are shown over time (along the x-axis). Significant timepoints during vehicle operation are shown at t1-t9.

Prior to t1, the hybrid vehicle is operating in an electric only mode with vehicle wheels being propelled using motor torque. In one example, vehicle operation in the electric mode is in response to a lower driver demand (plot 502). Due to the vehicle being propelled using motor torque, engine fueling is disabled (plot 508) and the battery SOC may be gradually decreasing as battery power is drawn to provide the motor torque (plot 512).

At t1, in response to an increase in driver demand (such as due to an operator accelerator pedal tip-in), the vehicle may be shifted to an engine mode wherein only engine torque is used to propel the vehicle and meet the driver demand. Herein the transition to the engine mode is due to the increase in driver demand exceeding a torque generatable by the motor. In particular, at t1, the engine is pulled-up wherein the engine is restarted while the vehicle is propelled via the motor. The engine pull-up includes resuming fuel delivery and fuel combustion in the engine cylinders, and increasing an engine torque output based on the driver demand.

To reduce pumping losses during the engine pull-up, the engine may be cranked with a valve lift profile_1 selected (plot 506). Between t1 and t2, as the engine cranks and moves towards threshold speed 505, profile_1 is maintained. At t2, once threshold speed 505 is crossed, and the engine reaches an idling speed, the valve lift may be transitioned to profile_2 via actuation of a cam profile actuator. Herein, profile_1 is applied during cranking while profile_2 is applied during idling. Profile_1 includes one of valve lift profiles 420-450 of FIG. 4 and profile_2 includes another of valve lift profile 420-450 of FIG. 4. Thereafter, as engine speed is raised to meet driver demand, the valve lift may be transitioned to profile_5, the default combustion valve lift profile, via actuation of the cam profile actuator. Profile_5 is then maintained. While the engine is restarted and cranked, torque transients are met using motor torque so as to maintain the driver requested vehicle speed. Then, once the engine has been sufficiently spun up and is capable of meeting the torque demand, the motor is disabled, resulting in motor torque output being discontinued and battery SOC being maintained.

At t3, there is a drop in torque demand and requested vehicle speed, and the vehicle is transitioned to an assist mode wherein a portion of the demanded torque is met using engine torque and a remaining portion of the torque is met using motor torque, thereby reducing fuel consumption. Since engine combustion is continued, profile_5 is maintained while the engine torque output is reduced and the motor torque output is increased with a corresponding drop in battery SOC.

At t4, there is a further drop in torque demand and requested vehicle speed, and the vehicle is returned to the electric mode wherein all the demanded torque is met using motor torque. Herein the transition to the electric mode is due to the drop in driver demand to a level generatable by the motor on its own. In particular, at t4, the engine is pulled-down wherein the engine is shutdown while the vehicle is propelled via the motor. The engine pull-down includes discontinuing fuel delivery and fuel combustion in the engine cylinders, and spinning the engine down to rest. As a result of the pull-down, the engine torque output is decreased.

To reduce pumping losses during the engine pull-down, profile_5 may be maintained until the engine speed reaches the threshold speed 505, and then the valve lift is transitioned to profile_3 via actuation of the cam profile actuator. Profile_3 is then maintained until the engine spins to rest. Profile_3 includes yet another of valve lift profile 420-450 of FIG. 4 and enables the engine to be spun to rest at a desired stopping position. Profile_3 is distinct from the valve lift profile applied during the engine pull-up. While the engine is pulled down, torque transients are met using motor torque so as to maintain the driver requested vehicle speed. At t5, in response to a vehicle shutdown request, the motor is also disabled, resulting in motor torque output being discontinued.

It will be appreciated that if the vehicle shutdown request were received at t4, while the engine was spinning and combusting fuel, the engine may have been shutdown with the valve lift transitioned to an alternate shutdown profile, such as profile_4, after the engine speed had dropped to the threshold speed. Alternatively, the same valve lift profile (Profile_3) may be applied for all engine pull-down events.

At t6, a vehicle restart request is received. In response to the vehicle restart request, the engine is restarted and cranked, and the vehicle is moved to the engine mode. In particular, at t6, the engine is restarted to propel the vehicle. The engine restart includes resuming fuel delivery and fuel combustion in the engine cylinders, and increasing an engine torque output based on the driver demand. To reduce pumping losses during the engine restart, the engine may be cranked with a valve lift profile_4 selected. Profile_4 includes yet another of valve lift profile 420-450 of FIG. 4. Herein, the profile selected during an engine restart during a vehicle start is distinct from the profile selected during an engine pull-up wherein the vehicle is being propelled using motor torque. Profile_4 is maintained as the engine cranks and moves towards threshold speed 505, as well as into an idling speed region. At t7, once each of the threshold speed 505 and the idling speed is crossed, the valve lift may be transitioned to profile_5 via actuation of the cam profile actuator. Profile_5 is then maintained.

During engine operation with profile_5, an engine output is adjusted to provide the requested vehicle speed and charge the battery. As a result, the SOC starts to increase.

At t8, responsive to a drop in torque demand, as well as sufficient battery SOC being available, the vehicle is moved to the electric mode wherein all the demanded torque is met using motor torque. In particular, at t8, the engine is pulled-down wherein the engine is shutdown while the vehicle is propelled via the motor. The engine pull-down includes discontinuing fuel delivery and fuel combustion in the engine cylinders, and spinning the engine down to rest. As a result of the pull-down, the engine torque output is decreased.

To reduce pumping losses during the engine pull-down, the valve lift is transitioned to profile_3 via actuation of the cam profile actuator responsive to the drop in driver demand. Profile_3 is then maintained until the engine spins to rest. Profile_3 enables the engine to be spun to rest at a desired stopping position. While the engine is pulled down, torque transients are met using motor torque so as to maintain the driver requested vehicle speed. Thereafter, only motor torque is used to propel the vehicle.

In an alternate example, the engine system may be operated with only two valve lift profiles including a default valve lift profile applied during regular cylinder combustion plus one alternative profile for engine restart and shutdown events. Herein, the alternative profile to be used may be pre-selected (from the first to fourth alternate valve lift profiles listed above) based on actuator design issues and other constraints. The controller may select when to use the default (e.g., normal) valve lift profile and when to use the alternative valve lift profile. In doing so, the control complexity and component requirement of the engine system is reduced.

In this way, alternate valve lift profiles may be used during engine cranking and engine shutdown events to reduce cylinder pressures. Consequently, torque pulsations experienced during those events are reduced, as well as associated NVH. The technical effect of reducing the cylinder pressure is that less engine power is lost in trying to overcome the cylinder pressure, improving vehicle performance. In a hybrid vehicle context, the reduction in cylinder pressure may result in the hybrid vehicle being operated in an electric for longer durations, improving fuel economy. In addition, engine restarts due to a driver change-of-mind restart can be performed more seamlessly, with less objectionable noise to the vehicle operator. Further still, engine shutdowns and restarts may be performed with higher repeatability.

One example method for a hybrid vehicle comprises: in response to an engine pull-down or pull-up event, actuating a cam actuator while pulling down or pulling up an engine to operate one or both of an intake valve and an exhaust valve of each cylinder according to an adjusted valve lift profile distinct from a unadjusted valve lift profile used during cylinder combustion, the adjusted valve lift profile enabling a lower cylinder compression pressure than the unadjusted profile; and selecting the adjusted profile based on a state of charge of an energy storage device. In the preceding example, pulling up the engine includes initiating fuel delivery and fuel combustion in the engine to spin the engine up from rest, pulling down the engine includes discontinuing fuel delivery to and fuel combustion in the engine to spin the engine down to rest. In any or all of the preceding examples, additionally or optionally, the adjusted valve lift profile has a valve lift that is distinct from the valve lift of the unadjusted profile, and the selecting is further based on one or more of a piston-to-valve clearance and a desired engine stopping position. In any or all of the preceding examples, additionally or optionally, the selecting includes selecting from a plurality of adjusted valve lift profiles including a first adjusted valve lift profile having an exhaust valve event in each of an exhaust stroke and a compression stroke of a cylinder cycle and an intake valve event in each of an intake stroke and an expansion stroke of the cylinder cycle, a peak valve lift of the first adjusted valve lift profile equal to a peak valve lift of the adjusted valve lift profile. In any or all of the preceding examples, additionally or optionally, the plurality of adjusted valve lift profiles further includes a second adjusted valve lift profile wherein the one or both of an intake valve and an exhaust valve of each cylinder are maintained open with a fixed lift during each of stroke of the cylinder cycle, the fixed lift smaller than the peak valve lift of the first adjusted valve lift profile. In any or all of the preceding examples, additionally or optionally, the plurality of adjusted valve lift profiles further includes a third adjusted valve lift profile wherein the one or both of an intake valve and an exhaust valve of each cylinder are maintained open with a fluctuating lift during each of stroke of the cylinder cycle, the fluctuating lift including an initial lift at a beginning and an end of each stroke of the cylinder cycle and a peak valve lift at a middle of each stroke of the cylinder cycle, the peak valve lift of the third profile equal to or smaller than the peak valve lift of the first adjusted valve lift profile, the initial lift of the third profile equal to or smaller than the fixed lift of the second adjusted valve lift profile. In any or all of the preceding examples, additionally or optionally, the plurality of adjusted valve lift profiles further includes a fourth adjusted valve lift profile wherein the one or both of an intake valve and an exhaust valve of each cylinder are maintained open with a fluctuating lift during each of stroke of the cylinder cycle, the fluctuating lift including an initial lift when a piston is at TDC in each stroke of the cylinder cycle and a peak valve lift at a middle of each stroke of the cylinder cycle and when the piston is at BDC in each stroke of the cylinder cycle, the peak valve lift of the fourth profile equal to or smaller than the peak valve lift of the first adjusted valve lift profile, the initial lift of the fourth profile equal to or smaller than the fixed lift of the second adjusted valve lift profile. In any or all of the preceding examples, additionally or optionally, the selecting includes: selecting one of the first, second, third, and fourth profiles when the state of charge is higher and selecting another of the first, second, third, and fourth profiles when the state of charge is lower. In any or all of the preceding examples, additionally or optionally, the method further comprises: selecting one of the first, second, third, and fourth profiles during the engine pull-down event and selecting another of the first, second, third, and fourth profiles during the engine pull-up event. In any or all of the preceding examples, additionally or optionally, the selecting further includes selecting a number and identity of the one or both of an intake valve and an exhaust valve of each cylinder. In any or all of the preceding examples, additionally or optionally, the method comprises: during the engine pull-up event, operating with the adjusted valve lift profile until an engine speed is above a threshold speed and then transitioning to the unadjusted valve lift profile; and during the engine pull-down event, operating with the unadjusted valve lift profile until the engine speed is below the threshold speed and then transitioning to the adjusted valve lift profile. In any or all of the preceding examples, additionally or optionally, the method further comprises: while operating with the unadjusted valve lift profile, compensating for a deficit in driver demand via motor torque from a motor coupled to the energy storage device.

Another example method for a hybrid vehicle, comprises: during a change from electric mode to engine mode of vehicle operation, operating all valves of each engine cylinder according to a first adjusted valve lift profile before transitioning to a default valve lift profile; and during a change from engine mode to electric mode of vehicle operation, transitioning from a default valve lift profile to operating all valves of each engine cylinder according to a second, different adjusted valve lift profile, wherein a cylinder compression pressure is lower in each of the first and second adjusted profiles relative to the default valve lift profile. In the preceding example, additionally or optionally, during both the change from electric mode to engine mode and the change from engine mode to electric mode, compensating for a deficit in driver demand via motor torque from a motor coupled to an energy storage device. n any or all of the preceding examples, additionally or optionally, both the change from the electric mode to engine mode and the change from engine mode to electric mode occur automatically without receiving input from a vehicle driver, and without a change in vehicle state or a key state. In any or all of the preceding examples, additionally or optionally, operating all valves according to the first adjusted valve lift profile includes actuating a cam actuator to select a first cam profile, operating all valves according to the second adjusted valve lift profile includes actuating the cam actuator to select a second, different cam profile, and wherein operating all valves according to the default valve lift profile includes actuating the cam actuator to select a default cam profile. In any or all of the preceding examples, additionally or optionally, the first adjusted valve lift profile is applied until engine speed is higher than a threshold, and wherein the second adjusted valve lift profile is applied when the engine speed is lower than the threshold.

Another example hybrid vehicle system comprises: an engine; a motor coupled to an energy storage device; a cam profile switching mechanism for switching between a plurality of cam profiles, each of the plurality of cam profiles associated with an alternate valve lift profile; and a controller with computer readable instructions stored on non-transitory memory for: in response to an engine restart triggered without input from a vehicle operator, cranking the engine with a first of the plurality of cam profiles selected to operate all intake valves and exhaust valves of all engine cylinders with at least a minimum valve lift through all strokes of a cylinder cycle; after engine speed is higher than a threshold speed, transitioning to a default valve lift profile to operate all intake valves of all engine cylinders with a fluctuating lift through only an intake stroke of the cylinder cycle, and operate all exhaust valves of all engine cylinders with a fluctuating lift through only an exhaust stroke of the cylinder cycle. In the preceding example, additionally or optionally, the controller includes further instructions for: in response to an engine shutdown triggered without input from a vehicle operator, spinning down the engine unfueled, and when the engine speed is lower than the threshold, spinning the engine to rest with a second of the plurality of cam profiles selected to operate all intake valves and exhaust valves of all engine cylinders with at least the minimum valve lift through all strokes of a cylinder cycle. In any or all of the preceding examples, additionally or optionally, the minimum valve lift when operating with the first or second cam profile is larger than the minimum valve lift when operating with default valve lift profile.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle, comprising:
in response to a hybrid engine shutdown or restart event, actuating a cam actuator while pulling down or pulling up an engine to operate one or both of an intake valve and an exhaust valve of each cylinder according to an adjusted valve lift profile distinct from an unadjusted valve lift profile used during cylinder combustion, the adjusted valve lift profile enabling a lower cylinder compression pressure than the unadjusted valve lift profile; and
selecting the adjusted profile based on a state of charge of an energy storage device.

2. The method of claim 1, wherein the hybrid engine shutdown and hybrid engine restart event occur automatically without receiving input from a vehicle driver, and without a change in vehicle state or a key state, and wherein restarting the engine includes initiating fuel delivery and fuel combustion in the engine to spin the engine up from rest, and wherein shutting down the engine includes discontinuing fuel delivery to, and fuel combustion in, the engine to spin the engine down to rest.

3. The method of claim 1, wherein the adjusted valve lift profile has a valve lift that is distinct from the valve lift of the unadjusted valve lift profile, and wherein the selecting is further based on each of a piston-to-valve clearance and a desired engine stopping position.

4. The method of claim 1, wherein the selecting includes selecting from a plurality of adjusted valve lift profiles including a first adjusted valve lift profile having an exhaust valve event in each of an exhaust stroke and a compression stroke of a cylinder cycle and an intake valve event in each of an intake stroke and an expansion stroke of the cylinder cycle, a peak valve lift of the first adjusted valve lift profile equal to a peak valve lift of the unadjusted valve lift profile.

5. The method of claim 4, wherein the plurality of adjusted valve lift profiles further includes a second adjusted valve lift profile wherein the one or both of the intake valve and the exhaust valve of each cylinder are maintained open with a fixed lift during each of stroke of the cylinder cycle, the fixed lift smaller than the peak valve lift of the first adjusted valve lift profile.

6. The method of claim 5, wherein the plurality of adjusted valve lift profiles further includes a third adjusted valve lift profile wherein the one or both of the intake valve and the exhaust valve of each cylinder are maintained open with a fluctuating lift during each of stroke of the cylinder cycle, the fluctuating lift including an initial lift at a beginning and an end of each stroke of the cylinder cycle and a peak valve lift at a middle of each stroke of the cylinder cycle, the peak valve lift of the third profile equal to or smaller than the peak valve lift of the first adjusted valve lift profile, the initial lift of the third profile equal to or smaller than the fixed lift of the second adjusted valve lift profile.

7. The method of claim 6, wherein the plurality of adjusted valve lift profiles further includes a fourth adjusted valve lift profile wherein the one or both of the intake valve and the exhaust valve of each cylinder are maintained open with a fluctuating lift during each of stroke of the cylinder cycle, the fluctuating lift including an initial lift when a piston is at TDC in each stroke of the cylinder cycle and a peak valve lift at a middle of each stroke of the cylinder cycle and when the piston is at BDC in each stroke of the cylinder cycle, the peak valve lift of the fourth profile equal to or smaller than the peak valve lift of the first adjusted valve lift profile, the initial lift of the fourth profile equal to or smaller than the fixed lift of the second adjusted valve lift profile.

8. The method of claim 7, wherein the selecting includes:
selecting one of the first, second, third, and fourth valve lift profiles when the state of charge is higher and selecting another of the first, second, third, and fourth valve lift profiles profiles when the state of charge is lower.

9. The method of claim 7, further comprising:
selecting one of the first, second, third, and fourth valve lift profiles during the engine pull-down event and selecting another of the first, second, third, and fourth valve lift profiles during the engine pull-up event.

10. The method of claim 1, wherein the selecting further includes selecting a number and identity of the one or both of the intake valve and the exhaust valve of each cylinder.

11. The method of claim 1, further comprising:
during the engine restart event, operating with the adjusted valve lift profile until an engine speed is above a threshold speed and then transitioning to the unadjusted valve lift profile; and
during the engine shutdown event, operating with the unadjusted valve lift profile until the engine speed is below the threshold speed and then transitioning to the adjusted valve lift profile.

12. The method of claim 1, further comprising:
while operating with the unadjusted valve lift profile, compensating for a deficit in driver demand via motor torque from a motor coupled to the energy storage device.

13. A method for a hybrid vehicle, comprising:
during a change from electric mode to engine mode of vehicle operation, operating all valves of each engine cylinder according to a first adjusted valve lift profile before transitioning to a default valve lift profile; and
during a change from engine mode to electric mode of vehicle operation, transitioning from the default valve life profile to operating all valves of each engine cylinder according to a second, different adjusted valve lift profile, wherein a cylinder compression pressure is lower in each of the first and second adjusted profiles relative to the default valve lift profile.

14. The method of claim 13, further comprising, during both the change from electric mode to engine mode and the change from engine mode to electric mode, compensating for a deficit in driver demand via motor torque from a motor coupled to an energy storage device.

15. The method of claim 13, wherein both the change from the electric mode to engine mode and the change from engine mode to electric mode occur automatically without receiving input from a vehicle driver, and without a change in vehicle state or a key state.

16. The method of claim 14, wherein operating all valves according to the first adjusted valve lift profile includes actuating a cam actuator to select a first cam profile, operating all valves according to the second adjusted valve lift profile includes actuating the cam actuator to select a second, different cam profile, and wherein operating all valves according to the default valve lift profile includes actuating the cam actuator to select a default cam profile.

17. The method of claim 13, wherein the first adjusted valve lift profile is applied until engine speed is higher than a threshold, and wherein the second adjusted valve lift profile is applied when the engine speed is lower than the threshold.

18. A hybrid vehicle system, comprising:
an engine;
a motor coupled to an energy storage device;
a cam profile switching mechanism for switching between a plurality of cam profiles, each of the plurality of cam profiles associated with an alternate valve lift profile; and
a controller with computer readable instructions stored on non-transitory memory for:
in response to an engine restart triggered without input from a vehicle operator,
cranking the engine with a first of the plurality of cam profiles selected to operate all intake valves and exhaust valves of all engine cylinders with at least a minimum valve lift through all strokes of a cylinder cycle;
after engine speed is higher than a threshold speed, transitioning to a default valve lift profile to operate all intake valves of all engine cylinders with a fluctuating lift through only an intake stroke of the cylinder cycle, and operate all exhaust valves of all engine cylinders with a fluctuating lift through only an exhaust stroke of the cylinder cycle.

19. The system of claim 18, wherein the controller includes further instructions for:
in response to an engine shutdown triggered without input from the vehicle operator,
spinning down the engine unfueled, and when the engine speed is lower than the threshold, spinning the engine to rest with a second of the plurality of cam profiles selected to operate all intake valves and exhaust valves of all engine cylinders with at least the minimum valve lift through all strokes of a cylinder cycle.

20. The system of claim 19, wherein the minimum valve lift when operating with the first or second cam profile is larger than the minimum valve lift when operating with default valve lift profile.

* * * * *